(12) United States Patent
Chen

(10) Patent No.: US 7,877,992 B2
(45) Date of Patent: Feb. 1, 2011

(54) HYDRAULIC POWER GENERATION SYSTEM DRIVEN BY COMPRESSION AIR PRODUCED BY FLUID

(76) Inventor: Tien-Chuan Chen, No. 59-5, Ko-Tzi-Lin, Wen-Lin Village, Chong-Lin County, Hsin-Chu Hsien (TW)

( * ) Notice: Subject to any disclaimer, the term of this patent is extended or adjusted under 35 U.S.C. 154(b) by 426 days.

(21) Appl. No.: 12/129,445

(22) Filed: May 29, 2008

(65) Prior Publication Data
US 2009/0293469 A1 Dec. 3, 2009

(51) Int. Cl.
*F16D 31/02* (2006.01)
(52) U.S. Cl. .......................................................... 60/398
(58) Field of Classification Search .................. 60/398; 290/54
See application file for complete search history.

(56) References Cited
U.S. PATENT DOCUMENTS

| | | | | |
|---|---|---|---|---|
| 4,055,950 A | * | 11/1977 | Grossman | 60/398 |
| 4,380,419 A | * | 4/1983 | Morton | 60/398 |
| 4,426,846 A | * | 1/1984 | Bailey | 60/398 |
| 6,672,054 B2 | * | 1/2004 | Merswolke et al. | 60/398 |
| 6,718,761 B2 | * | 4/2004 | Merswolke et al. | 60/398 |

* cited by examiner

*Primary Examiner*—Michael Leslie
(74) *Attorney, Agent, or Firm*—Birch, Stewart, Kolasch & Birch, LLP

(57) ABSTRACT

A hydraulic power generation system driven by compression air produced by fluid is provided. The present invention is featured in that it employs more than one group of windmills which can be driven by wind power, or utilizes hydraulic power, such as a river flow, tides at estuaries or bays to drive more than one group of hydraulic turbines. The rotation power of the windmills or the hydraulic turbines then drives a transmission and subsequently drives an air compressor to produce compression air. The compression air is compressed with a specific pressure and collectively stored in an air compression tank. The compression air stored in the air compression tank is guided to a water filled hermetic tank. The hermetic tank is connected with a hermetic water tower having a certain height, in which the hermetic tanks and the hermetic water tower are connected with a communicating pipe by which a pressure can be conducted. According to the Pascal's principle, when suffering the pressure of the compression air, the water stored in the hermetic tank is transmitted to the hermetic water tower up to a certain height thus obtaining a potential energy. The water is collectively stored at the certain height to obtain a large amount. Such a large amount of water can be downwardly guided to drive a hydraulic turbine which is connected to a power generator for generating power. After releasing the potential energy, the water can be conducted back to the hermetic tank via another communicating pipe for recycle use.

8 Claims, 5 Drawing Sheets

HYDRAULIC POWER GENERATION SYSTEM DRIVEN BY COMPRESSION AIR PRODUCED BY FLUID

BACKGROUND OF THE INVENTION

1. Field of the Invention

The present invention relates generally to a power generation system, and more particularly, to a power generation system adapted for generating power by natural power.

2. The Prior Arts

Current conventional wind power generation is typically applied by disposing a plurality of windmills in a clear wild site. Wind drives the windmill to rotate, and the rotation power is then transmitted to a generator to generating power. However, such a wind power generator is incapable of collecting smaller wind power to obtain a larger one for use.

Conventional hydraulic power generator and tidal power generator have a similar disadvantage as being incapable of guiding smaller hydraulic power to the land and collectively storing to obtain a large power for use.

As such, with respect to the loss of the foregoing smaller power, it is desired by the power scientific and technological enterprises to collectively storing the smaller power to obtain a larger power. In this concern, the present invention provides a hydraulic power generation device.

SUMMARY OF THE INVENTION

A primary objective of the present invention is to collectively storing small wind power, hydraulic power, or any other small natural power suitable for hydraulic power generation.

The present invention is featured in that it employs more than one group of windmills which can be driven by wind power. A windmill rotation transmission then drives an air compressor to produce compression air. The compression air is compressed with a specific pressure and collectively stored in an air compression tank. The compression air stored in the air compression tank is guided to a water filled hermetic tank. The hermetic tank is connected with a hermetic water tower having a certain height, in which the hermetic tanks and the hermetic water tower are connected with a communicating pipe by which a pressure can be conducted. According to the Pascal's principle, when suffering the pressure of the compression air, the water stored in the hermetic tank is transmitted to the hermetic water tower up to a certain height thus obtaining a potential energy. The water is collectively stored at the certain height to obtain a large amount. Such a large amount of water can be downwardly guided to drive a hydraulic turbine which is connected to a power generator for generating power. After releasing the potential energy, the water can be conducted back to the hermetic tank via another communicating pipe for recycle use.

The present invention is further featured in that it utilizes hydraulic power, such as a river flow, tides at estuaries or bays to drive more than one group of hydraulic turbines. The hydraulic turbines rotate a transmission and drive an air compressor to produce compression air. The compression air is compressed with a specific pressure and collectively stored in an air compression tank. The compression air stored in the air compression tank is guided to a water filled hermetic tank. The hermetic tank is connected with a hermetic water tower having a certain height, in which the hermetic tanks and the hermetic water tower are connected with a communicating pipe by which a pressure can be conducted. According to the Pascal's principle, when suffering the pressure of the compression air, the water stored in the hermetic tank is transmitted to the hermetic water tower up to a certain height thus obtaining a potential energy. The water is collectively stored at the certain height to obtain a large amount. Such a large amount of water can be downwardly guided to drive a hydraulic turbine which is connected to a power generator for generating power. After releasing the potential energy, the water can be conducted back to the hermetic tank via another communicating pipe for recycle use.

BRIEF DESCRIPTION OF THE DRAWINGS

The present invention will be apparent to those skilled in the art by reading the following detailed description of a preferred embodiment thereof, with reference to the attached drawings, in which:

FIG. 3a is a partially enlarged view of FIG. 3;

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
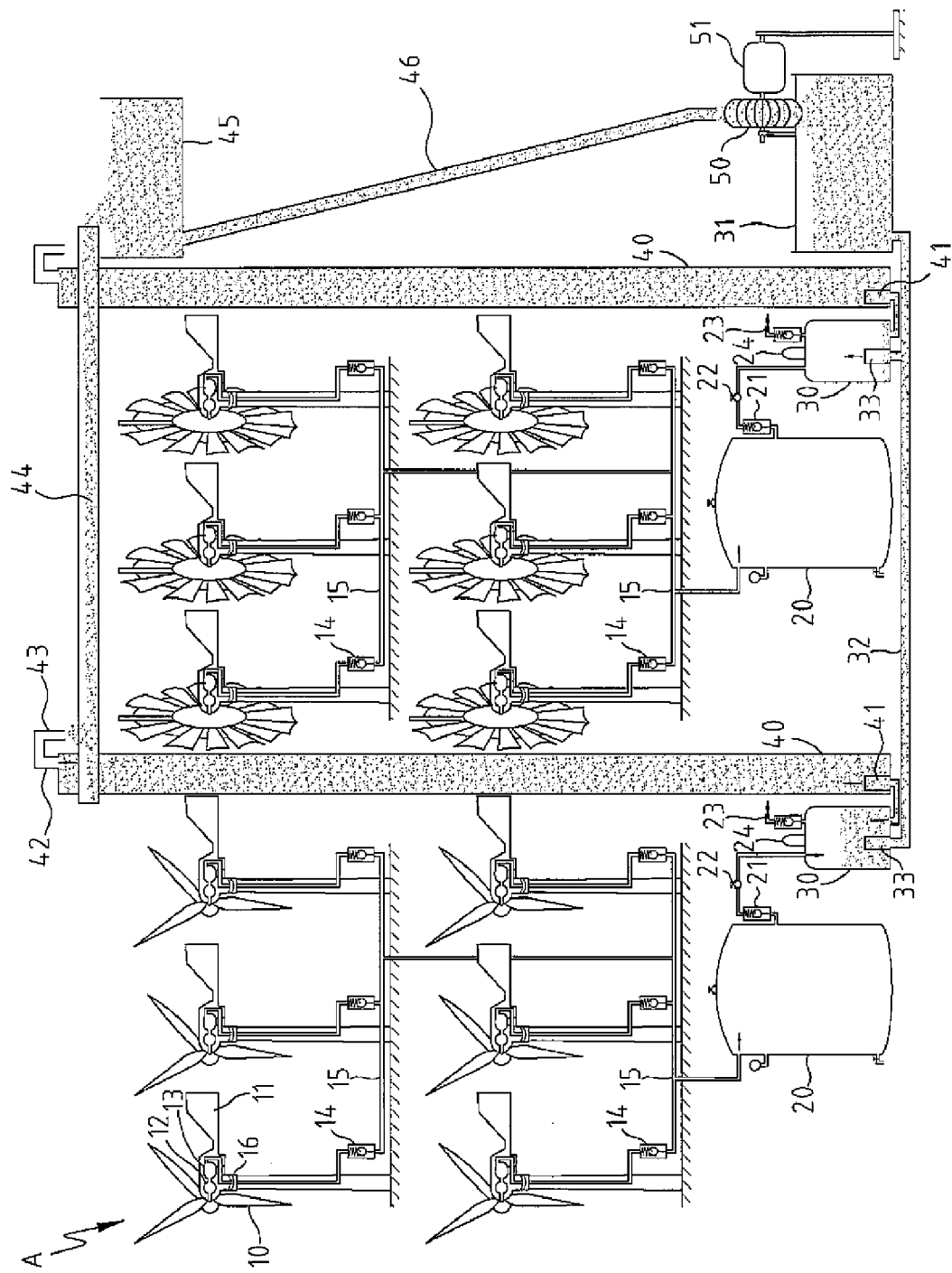
FIG. 1 is a schematic diagram illustrating a hydraulic power generation system producing compression air by wind power then storing the compression air, for further driving a hydraulic power generator to generate power according to an embodiment of the present invention.

FIG. 1 is a schematic diagram illustrating a hydraulic power generation system producing compression air by wind power then storing the compression air, for further driving a hydraulic power generator to generate power according to an embodiment of the present invention. Referring to FIG. 1, the hydraulic power generation system includes more than one group of windmills A, at least one group of air compression tanks 20, at least one hermetic tank 30, at least one hermetic water tower 40, and at least one set of power generator 51.

Each windmill A is equipped with wings 10. The wings 10 are configured for enduring wind power, and can be configured with any forms, e.g., the three-bladed type as shown in the left side of FIG. 1, or the wheel leave type as shown in the right side of FIG. 1. The windmill A is further equipped with a tail helm at a rear end of a rotation shaft. The windmill A includes a vertical shaft bearing 16 for allowing the wings 10 to horizontally rotate according to a change of the wind direction. The windmill A is preferably set up in a clear wild ground for obtaining an ideal windward plane. The rotation shaft of each windmill is connected with an air compressor 13 equipped with a pipeline. Each pipe is equipped with a check valve 14. The check valve 14 is connected with a collecting pipe 15 via the pipeline. When the windmill A is driven to rotate, a transmission 12 drives the air compressor 13 to operate and produce compression air. The compression air passes the check valve 14 and enters the collecting pipe 15.

The air compression tank 20 includes an air inlet which is connected with the collecting pipe 15 via a pipeline, and an air outlet connected with a pipeline on which an air inlet valve 21 and a pressure regulating valve 22 are sequentially equipped. This pipeline is connected to the hermetic tank 30. There are an air outlet valve 23 and a circuit component 24 equipped at a top of the hermetic tank 30. There is at least one pipeline connected from a bottom of the hermetic tank 30 to a communicating pipe 32. The communicating pipe 32 includes a water inlet valve 33 at a suitable position of the communicating pipe 32. There is also a pipeline connecting the bottom of the hermetic tank 30 to the hermetic water tank 40. Similarly, the pipeline connecting to the hermetic water tank 40 includes a water inlet valve 41 at a suitable position of the pipeline. Further, the communicating pipe 32 is also connected to a storage reservoir 31. The hermetic tank 30 and the hermetic water tower 40 are all filled with water. According to an aspect of the embodiment, if there is more than one group of hermetic water tower 40 employed, then the hydraulic power generation system correspondingly further includes a water collecting flume 44, so that the water stored in the hermetic water towers 40 can flow from water outlet valves 42 and overflow pipes 43 disposed over the hermetic water towers 40 for a certain height to the collecting flume 44, and then the water flows to an adjusting reservoir 45 with a certain height and obtaining a certain potential energy. The adjusting reservoir 45 is connected with a steel tube 46. A bottom end of the steel tube 46 aims the hydraulic turbine 50 connected to the power generator 51.

The operation of the embodiment of FIG. 1 is to be further illustrated herebelow.

In operation, a pressure transmitted into the air compression tank 20 is P, and a pressure of the pressure regulating valve 22 is set as P1, and therefore the air pressure in the hermetic tank 30 is P1. The water pressure in the hermetic water tower 40 is P2, therefore, when the hermetic tank 30 is filled full with water, the circuit component 24 equipped on the top of the hermetic tank 30 is informed, and at the same time the air outlet valve 23 at the tope of the hermetic tank 30 and the water inlet valve 33 at the bottom of the hermetic tank 30 are closed, and the water inlet valve 41 at the bottom of the hermetic water tower 40 and the water outlet valve 42 at the top of the hermetic water tower 40 and the air inlet valve 21 are opened. Meanwhile, the air pressure in the air compression tank 20 is transmitted to the hermetic tank 30 full of water. The hermetic tank 30 full of water suffers the air pressure P1, and configures a pressure conductor of P>P1>P2+1 atm (atmospheric pressure). According to Pascal's principle, the water presently stored in the hermetic tank 30 is driven by pressure to flow to the hermetic water tower 40 via the water inlet 41 at the bottom of the hermetic water tower 40, and is then transmitted to the water outlet valve 42 at the top of the hermetic water tower 40 and is release there. The water then flows into the water collecting flume 44 via the overflow pipe 43. Then, the water flows from the water collecting flume 44 into the adjusting reservoir 45. The water that flows into the adjusting reservoir 45 obtains a certain potential energy. In such a way, the adjusting reservoir 45 accumulates small water flows and obtains a large amount of water with a great potential energy. Then, the large amount of water is guided by the steel tube 46 down to drive the hydraulic turbine 50 to rotate. The hydraulic turbine 50 then drives the power generator 51 to generate power. After the entire process, the water is guided to flow back to the storage reservoir 31 for recycle use.

When the water filled in the hermetic tank 30 is substantially exhausted and the hermetic tank 30 is filled with air, the circuit component 24 is again informed. At the same time, the air outlet valve 23 at the top of the hermetic tank 30 and the water inlet valve 33 at the bottom of the hermetic tank are opened, and the water inlet valve 41 at the bottom of the hermetic water tower 40 and the water outlet valve 42 at the top of the hermetic water tower 40 and the air inlet valve 21 are closed. Meanwhile, the air present in the hermetic tank 30 is exhausted from the air outlet valve 23, and the recycled water stored in the storage reservoir 31 flows back to the hermetic tank 30 via the communicating pipe 32 and the water inlet valve 33.

Figure 2A:
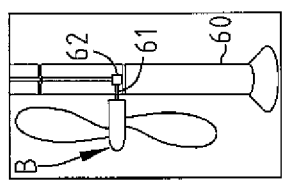
FIG. 2a is a partially enlarged view of FIG. 2.
Figure 2:
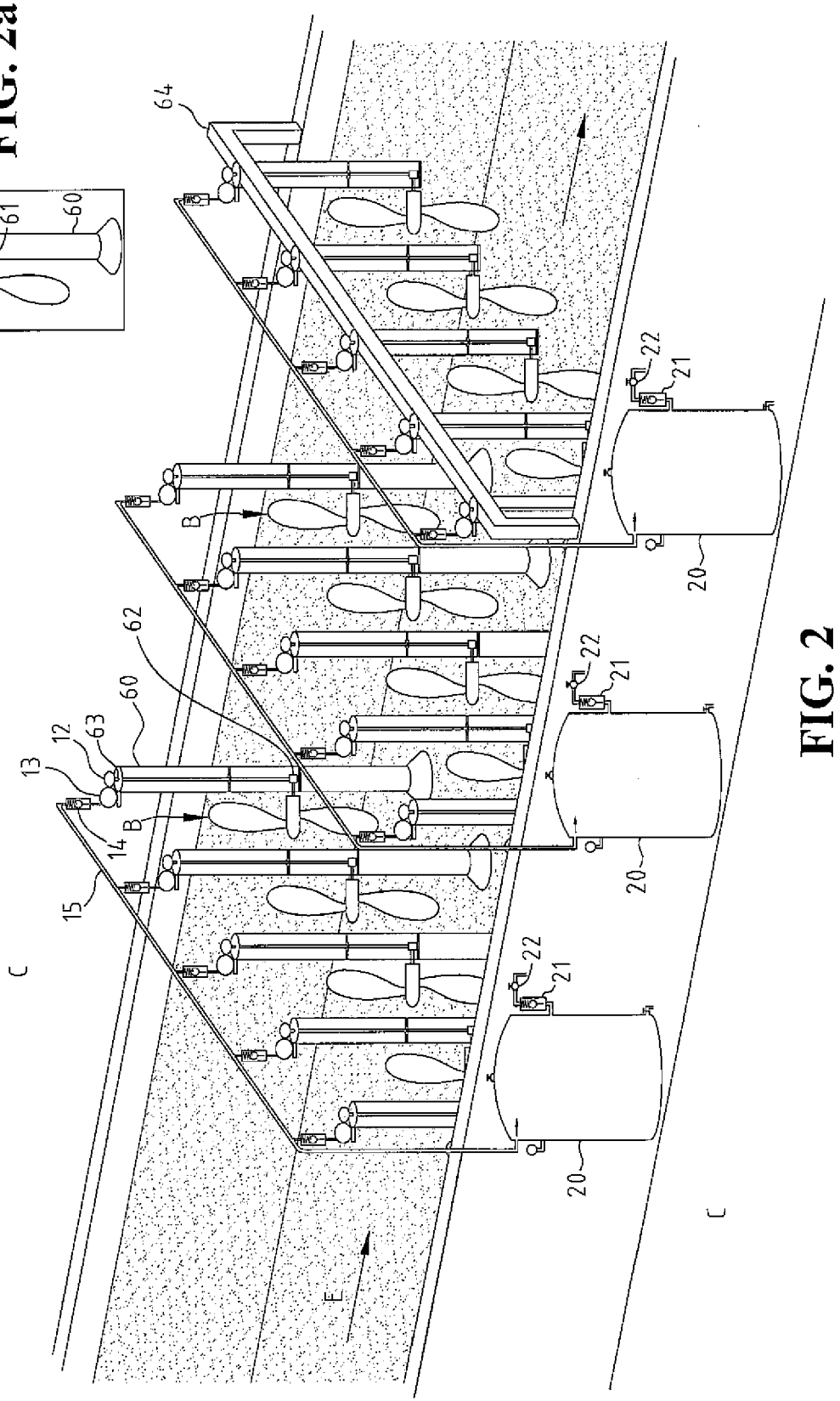
FIG. 2 is a schematic diagram illustrating a hydraulic power generation system producing compression air with a hydraulic turbine driven by a river flow, and then storing the compression air, for further driving a hydraulic power generator to generate power according to an embodiment of the present invention.

FIG. 2 is a schematic diagram illustrating a hydraulic power generation system producing compression air with a hydraulic turbine driven by a river flow, and then storing the compression air, for further driving a hydraulic power generator to generate power according to an embodiment of the present invention. FIG. 2a is a partially enlarged view of FIG. 2. Referring to FIGS. 2 and 2a, more than one group of hydraulic turbines B are set in a river flow E, and are fixed to a riverbed with a fixing structure 60, or suspended with a suspension structure, or otherwise fixed to a gate of a cofferdam. The river flow drives one of the hydraulic turbines B to rotate. The hydraulic turbine B is assisted by a hermetic bearing 61 to rotate a spiral bevel steering gear set 62. Assisted by a hermetic bearing 63, the spiral bevel steering gear set 62 then drives a transmission 12. The transmission 12 then drives an air compressor 13 to produce compression air. The compression air has a specific pressure P. The compression air flows into a collecting pipe 15 via a check valve 14, and is then guided to a land C, and collectively stored in more than one set of air compression tanks 20. The compression air stored in the air compression tanks 20 is then transmitted to a hermetic tank 30 in a way as discussed in FIG. 1. In a similar way, water is transmitted to a high position and obtains a potential energy so as to drive a hydraulic turbine to generate power.

Figure 3:
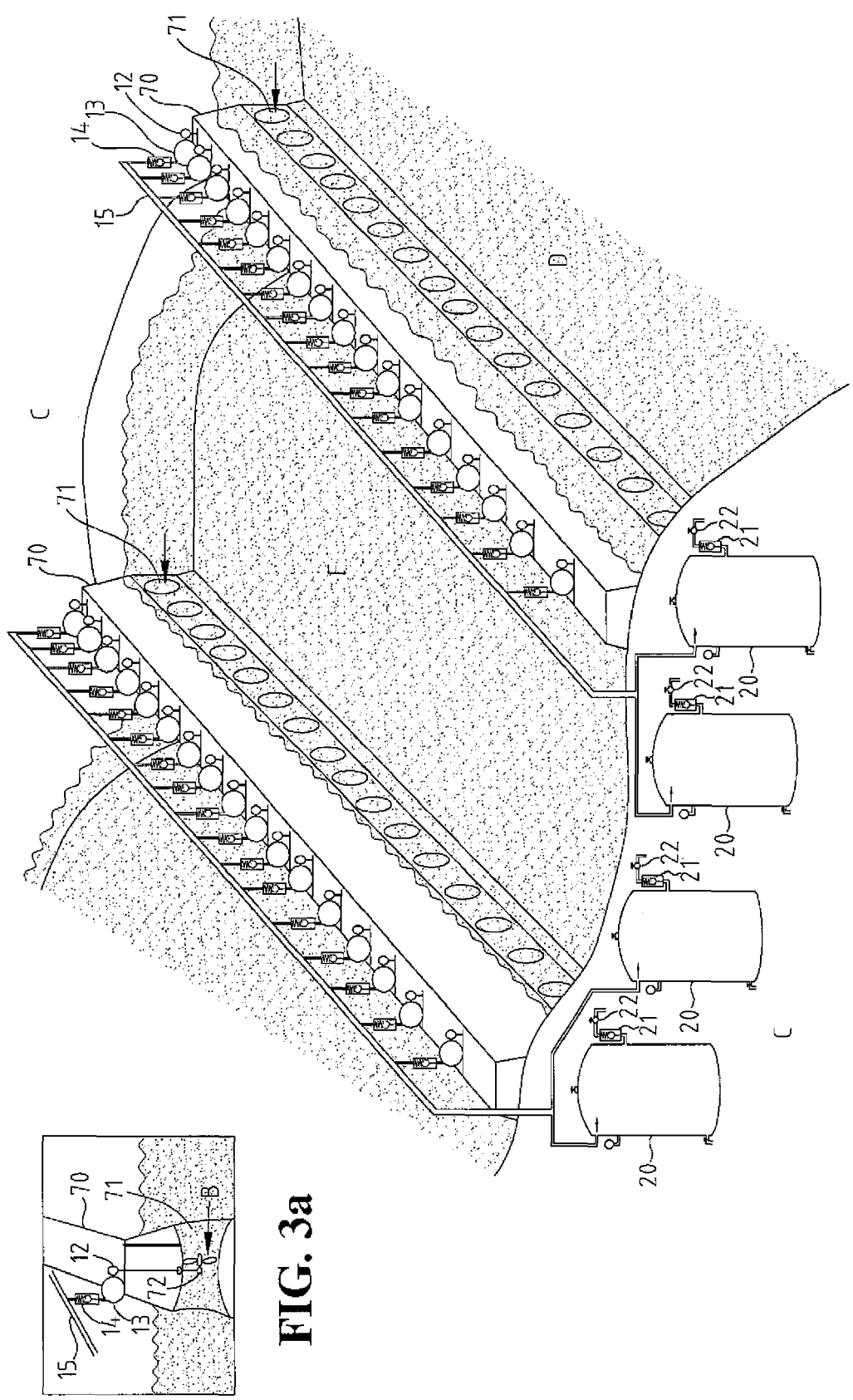
FIG. 3 is a schematic diagram illustrating a hydraulic power generation system producing compression air with a hydraulic turbine driven by a river flow, and then storing the compression air, for further driving a hydraulic power generator to generate power according to an embodiment of the present invention.

FIG. 3 is a schematic diagram illustrating a hydraulic power generation system producing compression air with a hydraulic turbine driven by a river flow, and then storing the compression air, for further driving a hydraulic power generator to generate power according to an embodiment of the present invention. FIG. 3a is a partially enlarged view of FIG. 3. Referring to FIGS. 3 and 3a, a multiple-dam cofferdam 70 are constructed in a tidy F of an estuary. A plurality of controllable gates 71 are disposed in the cofferdam 70 for allowing seawater to flow in and out. Hydraulic turbines B are equipped at the controllable gates 71. During a flood tide or an ebb tide, seawater flows in and out the gate 71 and drives the hydraulic turbines B to rotate a spiral bevel steering gear set 72, and then drives a transmission 12. The transmission 12 then drives an air compressor 13 to produce compression air. The compression air has a specific pressure P. The compression air flows into a collecting pipe 15 via a check valve 14, and is then guided to a land C, and collectively stored in more than one set of air compression tanks 20. The compression air stored in the air compression tanks 20 is then transmitted to a hermetic tank 30 in a way as discussed in FIG. 1. In a similar way, water is transmitted to a high position and obtains a potential energy so as to drive a hydraulic turbine to generate power.

Figure 4:
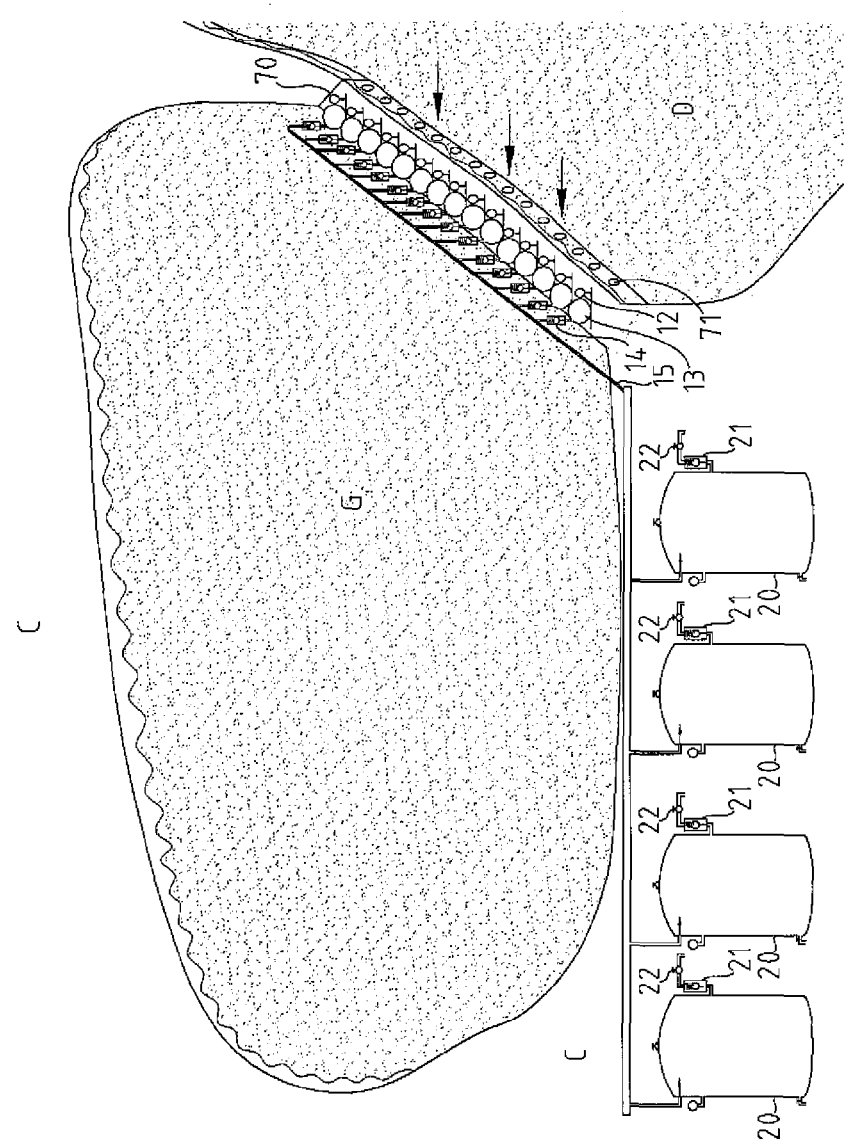
FIG. 4 is a schematic diagram illustrating a hydraulic power generation system producing compression air with a hydraulic turbine set in a bay and driven by a bay tidy, and then storing the compression air, for further driving a hydraulic power generator to generate power according to an embodiment of the present invention.
Figure 4A:
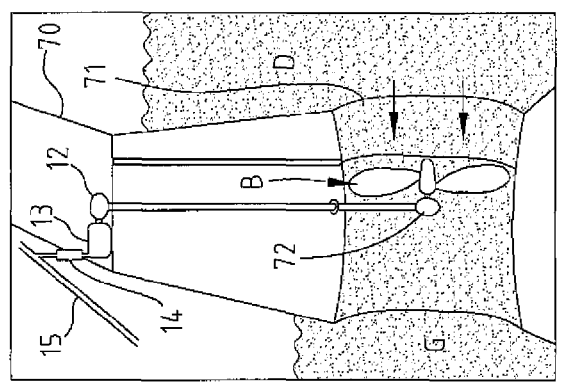
FIG. 4a is a partially enlarged view of FIG. 4.

FIG. 4 is a schematic diagram illustrating a hydraulic power generation system producing compression air with a hydraulic turbine set in a bay and driven by a bay tidy, and then storing the compression air, for further driving a hydraulic power generator to generate power according to an embodiment of the present invention. FIG. 4a is a partially enlarged view of FIG. 4. Referring to FIGS. 4 and 4a, a cofferdam 70 is constructed in a bay tide G. A plurality of controllable gates 71 are disposed in the cofferdam 70 for allowing seawater to flow in and out. Hydraulic turbines B are equipped at the controllable gates 71. During a flood tide or an ebb tide, seawater flows in and out the gate 71 and drives the hydraulic turbines B to rotate a spiral bevel steering gear set 72, and then drives a transmission 12. The transmission 12 then drives an air compressor 13 to produce compression air. The compression air has a specific pressure P. The compression air flows into a collecting pipe 15 via a check valve 14, and is then guided to a land C, and collectively stored in more than one set of air compression tanks 20. The compression air stored in the air compression tanks 20 is then transmitted to a hermetic tank 30 in a way as discussed in FIG. 1. In a similar way, water is transmitted to a high position and obtains a potential energy so as to drive a hydraulic turbine to generate power.

Figure 5:
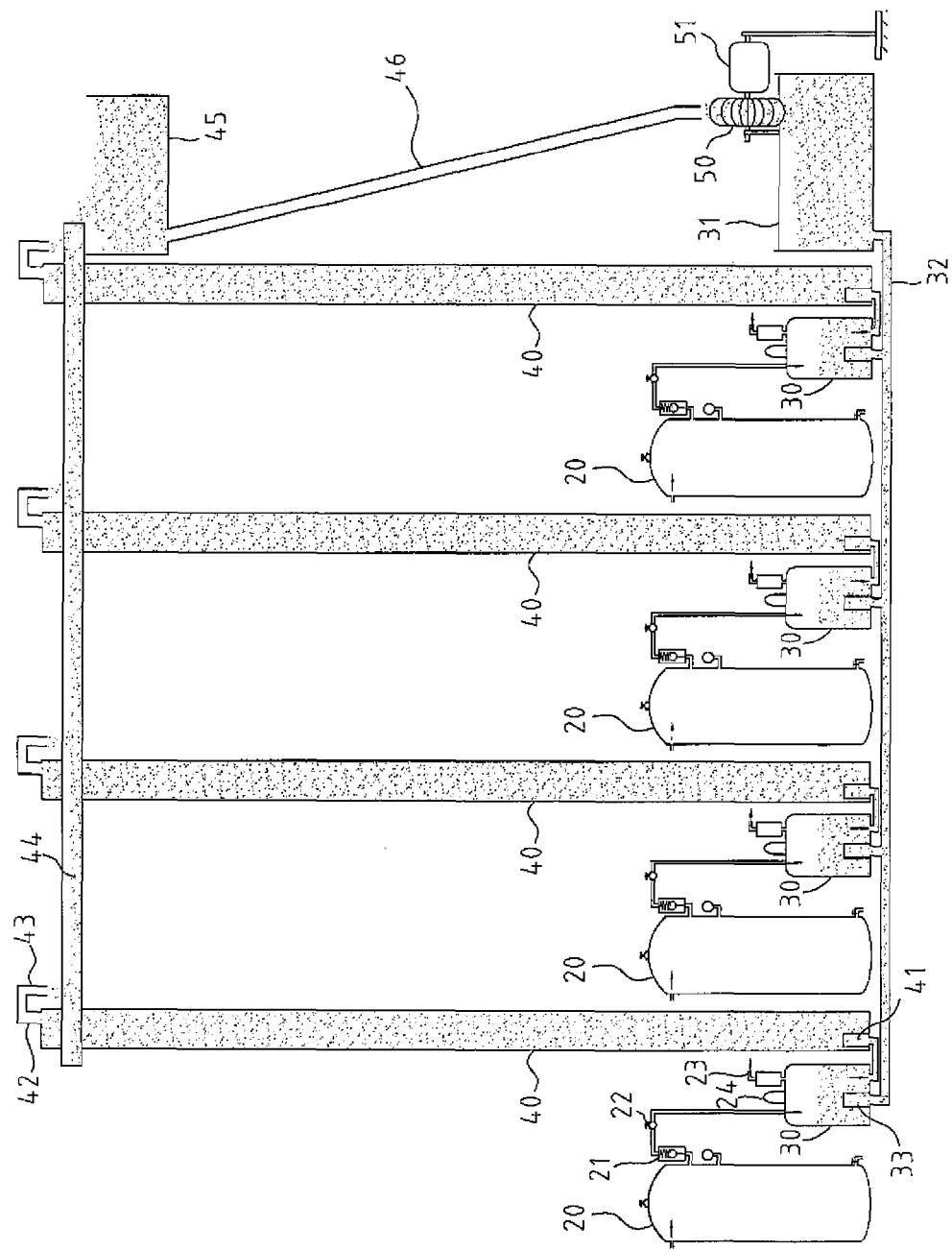
FIG. 5 illustrates an assembly including a plurality of air compression tanks, a hermetic tank, a hermetic water tower, for providing more presser conductors and obtaining a larger power generation capacity, provided for the hydraulic power generation systems as illustrated in FIGS. 1 through 4, according to an embodiment of the present invention.

FIG. 5 illustrates an assembly including a plurality of air compression tanks, a hermetic tank, a hermetic water tower, for providing more presser conductors and obtaining a larger power generation capacity, provided for the hydraulic power generation systems as illustrated in FIGS. 1 through 4, according to an embodiment of the present invention. Referring to FIG. 5, the more than one group of windmills A as shown in FIG. 1 rotate the transmission 12, and then drive the air compressor 13 to produce compression air. The compression air is collectively stored in multiple air compression tanks 20, thus configuring more than one group of pressure conductors.

The devices as illustrated in FIGS. 2 through 4 respectively cooperating with the device of FIG. 5, are respectively set in a river flow E, an estuary tide F, and a bay tide G. More than one group of hydraulic turbines B drive the air compressor 13 to produce compression air. The compression air is guided to the land C and collectively stored in multiple air compression tanks 20, thus configuring more than one group of pressure conductors. when the hermetic tank 30 is filled fall with water, the circuit component 24 equipped on the top of the hermetic tank 30 is informed, and at the same time the air outlet valve 23 at the tope of the hermetic tank 30 and the water inlet valve 33 at the bottom of the hermetic tank 30 are closed, and the water inlet valve 41 at the bottom of the hermetic water tower 40 and the water outlet valve 42 at the top of the hermetic water tower 40 and the air inlet valve 21 are opened. Meanwhile, the air pressure in the air compression tank 20 is transmitted to the hermetic tank 30 full of water. The hermetic tank 30 full of water suffers the air pressure P1, and configures a pressure conductor of P>P1>P2+1 atm (atmospheric pressure). According to Pascal's principle, the water presently stored in the hermetic tank 30 is driven by pressure to flow to the hermetic water tower 40 via the water inlet 41 at the bottom of the hermetic water tower 40, and is then trans- mitted to the water outlet valve 42 at the top of the hermetic water tower 40 and is release there. The water then flows into the water collecting flume 44 via the overflow pipe 43. Then, the water flows from the water collecting flume 44 into the adjusting reservoir 45. The water that flows into the adjusting reservoir 45 obtains a certain potential energy. In such a way, the adjusting reservoir 45 accumulates small water flows and obtains a large amount of water with a great potential energy. More air compression tanks 20 corresponding to more hermetic tanks 30 filled full of water and more hermetic water towers 40, configure more pressure conductors, and thus capable of transmitting more water to the certain height and can be collected in the adjusting reservoir 45 for obtaining a greater potential energy. Then, the water is guided by the steel tube 46 down to drive the hydraulic turbine 50 to rotate. The hydraulic turbine 50 then drives the power generator 51 to generate power. After the entire process, the water is guided to flow back to the storage reservoir 31 for recycle use.

The present invention has the following advantages:

(1) Two or more groups of windmills are driven by wind power, the windmills then drive the air compressor to produce compression air. The compression air has a certain pressure and is stored in an air compression tank. In such a way, smaller wind power can be accumulated to obtain a greater energy, thus achieving practical power generation efficiency and profit.

(2) In a river flow, tides at an estuary or a bay, the hydraulic power thereof is utilized to drive two or more hydraulic turbines. The hydraulic turbines then drive a transmission, and then drive an air compressor to produce compression air. The compression air has a certain pressure and is stored in an air compression tank. In such a way, smaller hydraulic power can be accumulated to obtain a greater energy, thus achieving practical power generation efficiency and profit.

(3) In a river flow, tides at an estuary or a bay, the hydraulic power thereof is utilized to drive two or more hydraulic turbines. Smaller power is collectively guided to the land for power generation. The construction and maintenance are convenient and cheap.

(4) The present invention utilizes natural power which is inexhaustible, and does not produce any carbon dioxide, and greenhouse effect, and therefore is environment-friendly.

(5) The present invention utilizes fluid such as wind, water to produce compression air. The wind power and hydraulic power are converted into an air pressure serving as a driving power. Air has better flowability and is convenient for operation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A hydraulic power generation system driven by compression air produced by fluid, comprising:

a plurality of windmills, adapted for rotating to drive a transmission and subsequently drive an air compressor to produce compression air;

at least one air compression tank, connected to the air compressor, for storing the compression air;

at least one hermetic tank, connected with the air compression tank, wherein the hermetic tank is filled full of water, and the compression air stored in the air compression tank is conducted into the hermetic tank;

at least one hermetic water tower, connected with the hermetic tank, and being filled full of water;

at least one water collecting flume, set at a specific height, for receiving water overflowed from a top of the hermetic water tower;

at least one adjusting reservoir, set at a certain height, for receiving water overflowed from the water collecting flume, wherein the adjusting reservoir is connected with a steel tube, and a bottom of the steel tube extends to a lower position;

a power generator, connected to a hydraulic turbine disposed at a position corresponding to the bottom of the steel tube, for being driven by water flowing from the steel tube to rotate and drive the power generator to generate power; and a storage reservoir, connected to the hydraulic turbine, for collecting water flowing from the steel tube.

2. The hydraulic power generation system driven by compression air produced by fluid according to claim 1, wherein a communicating pipe connecting the air compression tank and the hermetic tank is equipped with an air inlet valve and a pressure regulating valve; the hermetic tank is equipped with an air outlet valve and a circuit component; a water inlet valve is equipped at a bottom of the hermetic tank, and a communicating pipe is equipped at the bottom of the hermetic tank connecting with the storage reservoir; a water inlet valve is equipped at a bottom of the hermetic water tower for connecting with the hermetic tank, and a water outlet valve is equipped at a top of the hermetic water tower, wherein the circuit component is adapted for sensing whether the hermetic tank is filled full of water or not, and so as to control opening/closing of the air outlet valve and water inlet valve equipped at the hermetic tank, and the water inlet valve and water outlet valve equipped at the hermetic water tower.

3. A hydraulic power generation system driven by compression air produced by fluid, comprising:

a plurality of hydraulic turbines, set in water flows, adapted for being driven by the water flows to rotate to drive a transmission and subsequently drive an air compressor to produce compression air;

at least one air compression tank, connected to the air compressor, for storing the compression air;

at least one hermetic tank, connected with the air compression tank, wherein the hermetic tank is filled full of water, and the compression air stored in the air compression tank is conducted into the hermetic tank;

at least one hermetic water tower, connected with the hermetic tank, and being filled full of water;

at least one water collecting flume, set at a specific height, for receiving water overflowed from a top of the hermetic water tower;

at least one adjusting reservoir, set at a certain height, for receiving water overflowed from the water collecting flume, wherein the adjusting reservoir is connected with a steel tube, and a bottom of the steel tube extends to a lower position;

a power generator, connected to a second hydraulic turbine disposed at a position corresponding to the bottom of the steel tube, for being driven by water flowing from the steel tube to rotate and drive the power generator to generate power; and a storage reservoir, connected to the hydraulic turbine, for collecting water flowing from the steel tube.

4. The hydraulic power generation system driven by compression air produced by fluid according to claim 3, wherein the hydraulic turbines are fixed to a riverbed by a fixing structure.

5. The hydraulic power generation system driven by compression air produced by fluid according to claim 3, wherein the hydraulic turbines are suspended in a river flow by a suspension structure.

6. The hydraulic power generation system driven by compression air produced by fluid according to claim 3, wherein the hydraulic turbines are fixed at gates of a cofferdam of a river.

7. The hydraulic power generation system driven by compression air produced by fluid according to claim 3, wherein the water flows are provided by an estuary tide, and wherein a multiple-dam cofferdam is constructed in the estuary tide, and more than one group of controllable gates are disposed in the cofferdam for allowing seawater to flow in and out to drive the hydraulic turbines to rotate.

8. The hydraulic power generation system driven by compression air produced by fluid according to claim 3, wherein a communicating pipe connecting the air compression tank and the hermetic tank is equipped with an air inlet valve and a pressure regulating valve; the hermetic tank is equipped with an air outlet valve and a circuit component; a water inlet valve is equipped at a bottom of the hermetic tank, and a communicating pipe is equipped at the bottom of the hermetic tank connecting with the storage reservoir; a water inlet valve is equipped at a bottom of the hermetic water tower for connecting with the hermetic tank, and a water outlet valve is equipped at a top of the hermetic water tower, wherein the circuit component is adapted for sensing whether the hermetic tank is filled full of water or not, and so as to control opening/closing of the air outlet valve and water inlet valve equipped at the hermetic tank, and the water inlet valve and water outlet valve equipped at the hermetic water tower.

* * * * *